(12) United States Patent
Bykov

(10) Patent No.: US 9,067,478 B2
(45) Date of Patent: Jun. 30, 2015

(54) CAR ROOF CONVERSION DEVICE

(71) Applicant: Dmitrij Viktorovich Bykov, Michurinsk (RU)

(72) Inventor: Dmitrij Viktorovich Bykov, Michurinsk (RU)

( * ) Notice: Subject to any disclaimer, the term of this patent is extended or adjusted under 35 U.S.C. 154(b) by 0 days.

(21) Appl. No.: 14/124,776

(22) PCT Filed: Feb. 8, 2013

(86) PCT No.: PCT/RU2013/000099
§ 371 (c)(1),
(2) Date: Dec. 9, 2013

(87) PCT Pub. No.: WO2014/017948
PCT Pub. Date: Jan. 30, 2014

(65) Prior Publication Data
US 2015/0145278 A1    May 28, 2015

(30) Foreign Application Priority Data

Jul. 24, 2012 (RU) .................................. 2012131803

(51) Int. Cl.
*B60J 7/00* (2006.01)
*B60J 7/02* (2006.01)

(52) U.S. Cl.
CPC ....................... *B60J 7/028* (2013.01)

(58) Field of Classification Search
CPC ...................................................... B60J 7/028
See application file for complete search history.

(56) References Cited

U.S. PATENT DOCUMENTS

| | | | |
|---|---|---|---|
| 4,854,634 A * | 8/1989 | Shiraishi et al. | 296/108 |
| 5,033,789 A * | 7/1991 | Hayashi et al. | 296/216.02 |
| 6,334,644 B1 | 1/2002 | Gurtler et al. | |
| 6,695,386 B1 * | 2/2004 | Willard | 296/107.17 |
| 7,063,371 B2 * | 6/2006 | Willard | 296/107.17 |

FOREIGN PATENT DOCUMENTS

| | | |
|---|---|---|
| DE | 102008005602 A1 | 7/2009 |
| RU | 2271942 C1 | 3/2006 |

* cited by examiner

*Primary Examiner* — Lori L Lyjak
(74) *Attorney, Agent, or Firm* — Nadya Reingand

(57) ABSTRACT

Invention relates to automotive industry, namely, to cars with convertible roofs. The roof front and rear sections 1, 2 are hinged together. The proposed device comprises a main moving support with a roof drive, a leverage drive mounted at said main support, a system of articulated levers and a drive stem hinged to said front and rear sections and leverage, as well as a drive of said main moving support and a drive of moving support inclination. Appropriate pendulum supports of said drives are secured at fixed points 1 of the car body. The roof rear section is provided with a tooth element, for example, a gear wheel fragment interacting with the roof drive. The leverage is articulated with the drive stem. Said drives comprise screw pairs, twin guides and motors with reduction gear to transmit rotation to the screw shafts. When roof is in a folded position, it provides increased trunk space.

11 Claims, 9 Drawing Sheets

CAR ROOF CONVERSION DEVICE

CROSS-REFERENCE TO RELATED APPLICATIONS

Figure 1:
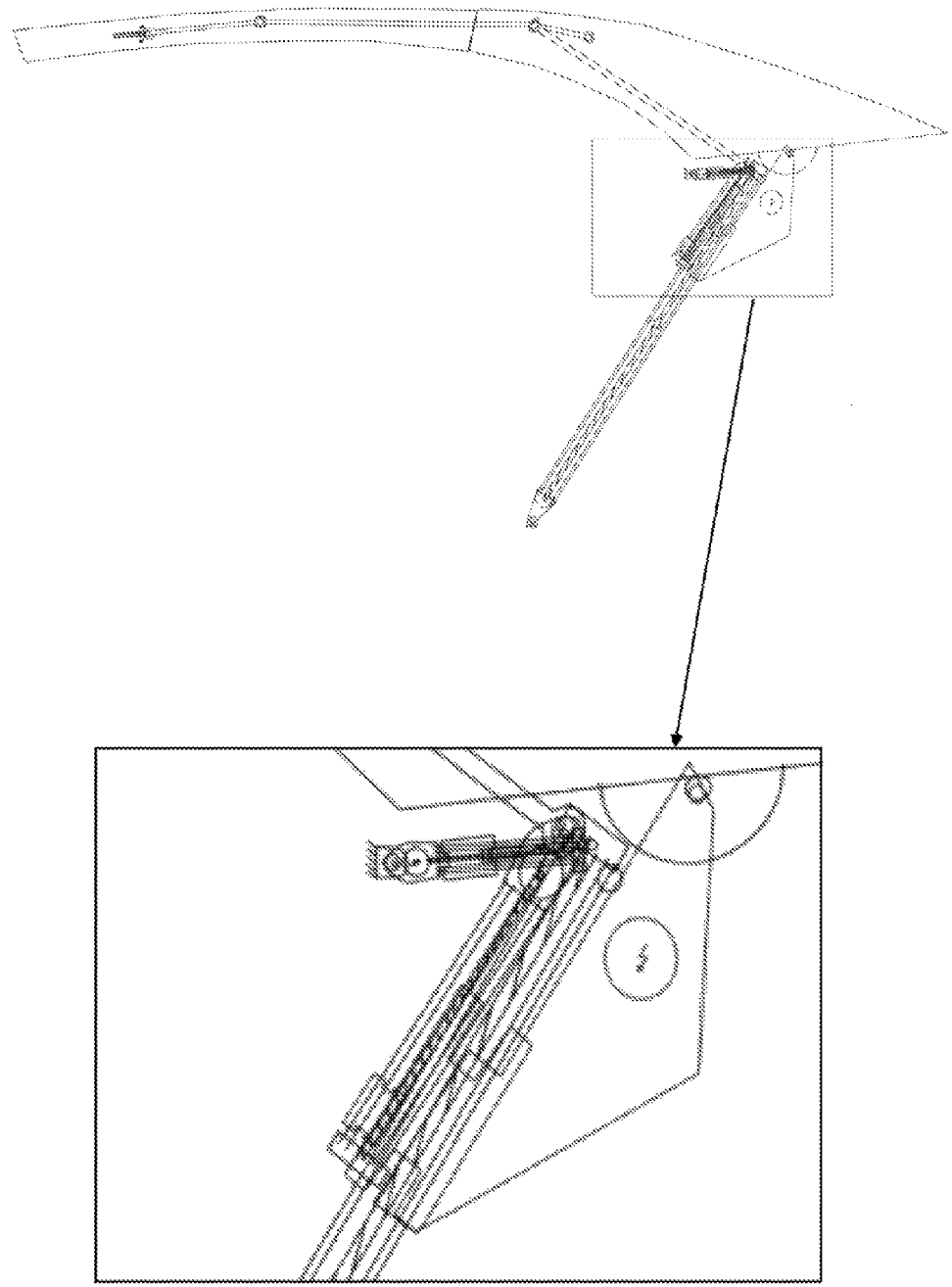
Figure 2:
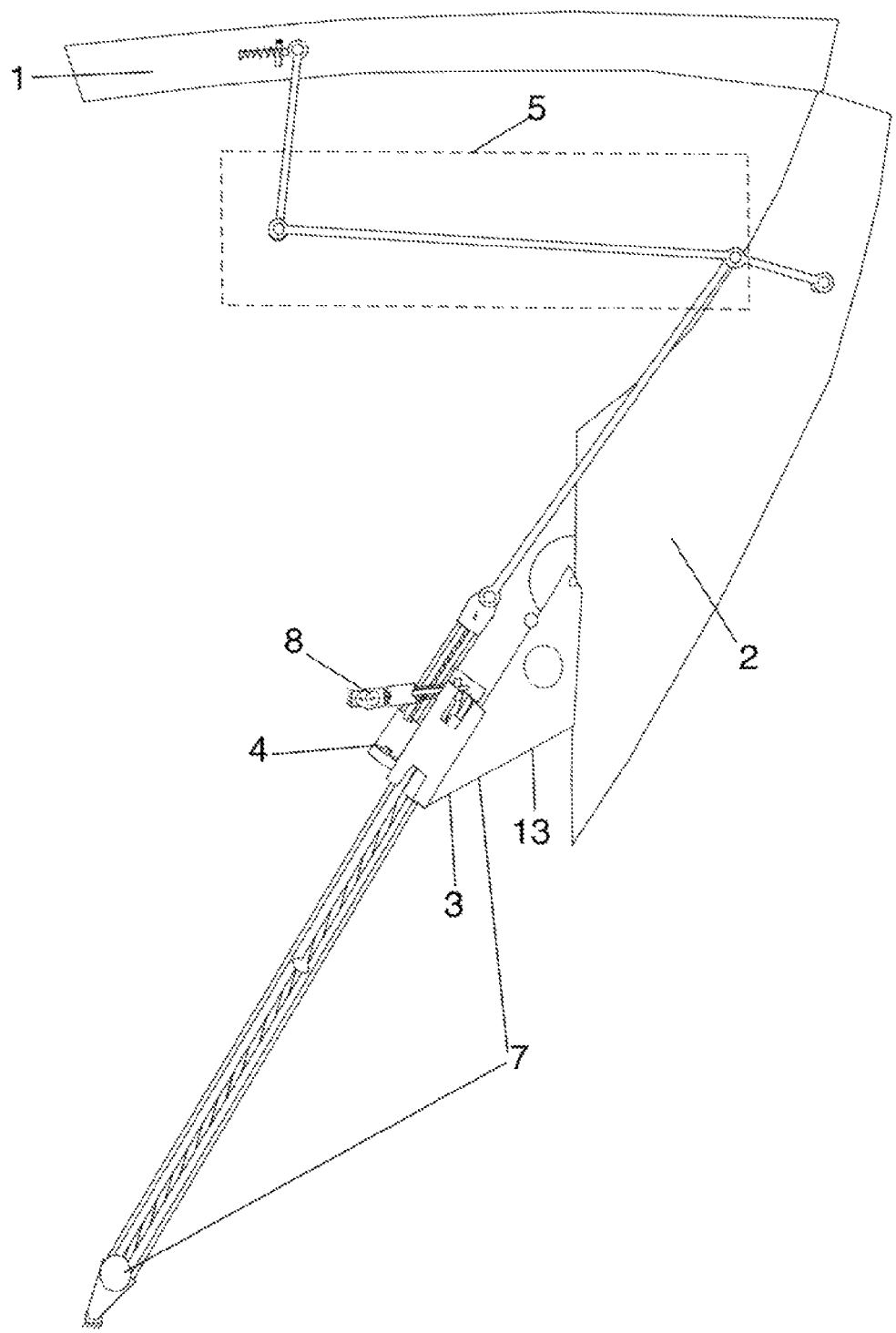
Figure 3:
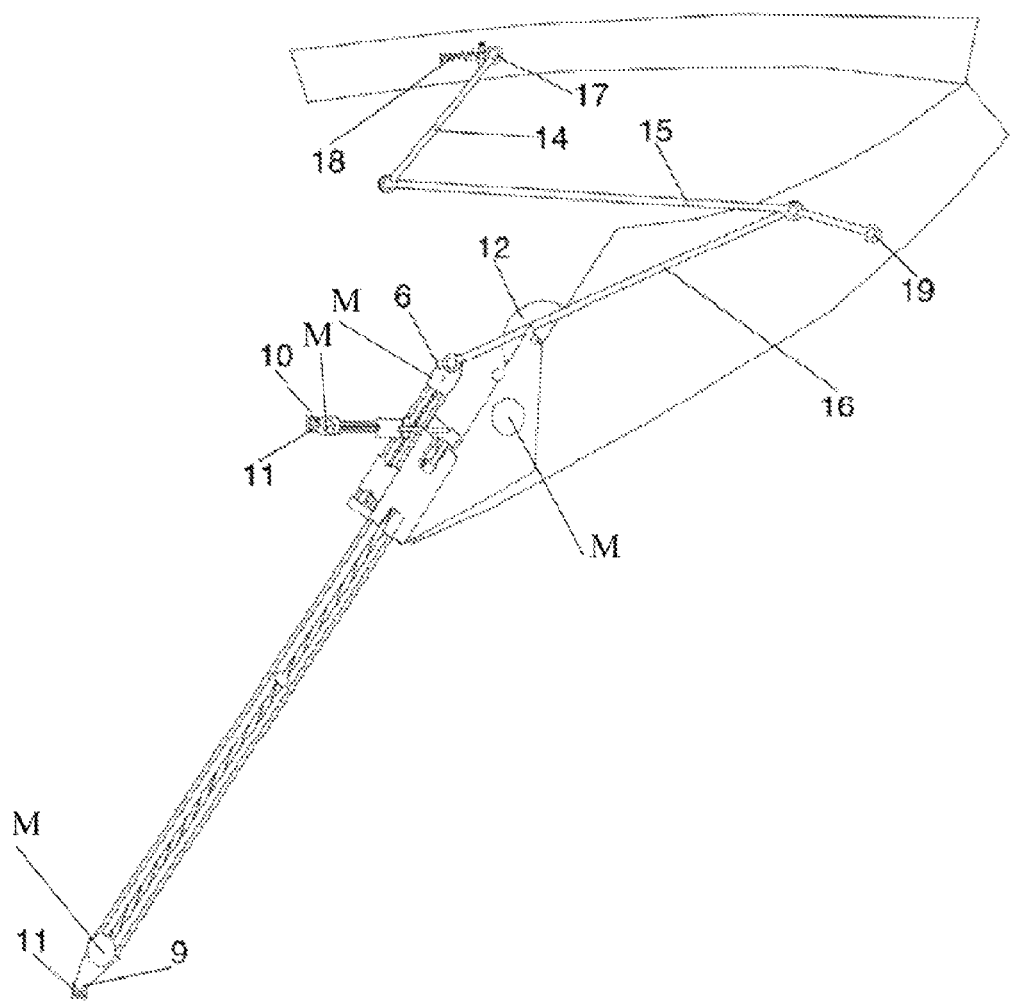
Figure 4:
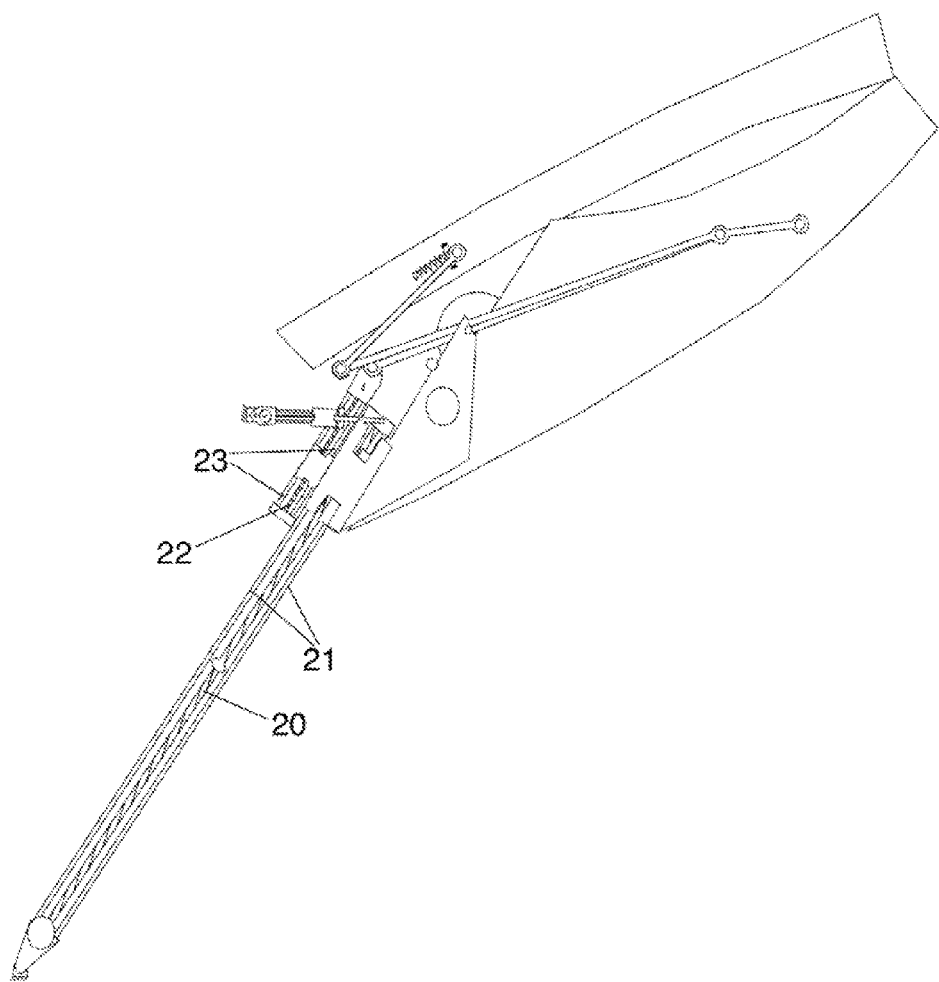
Figure 5:
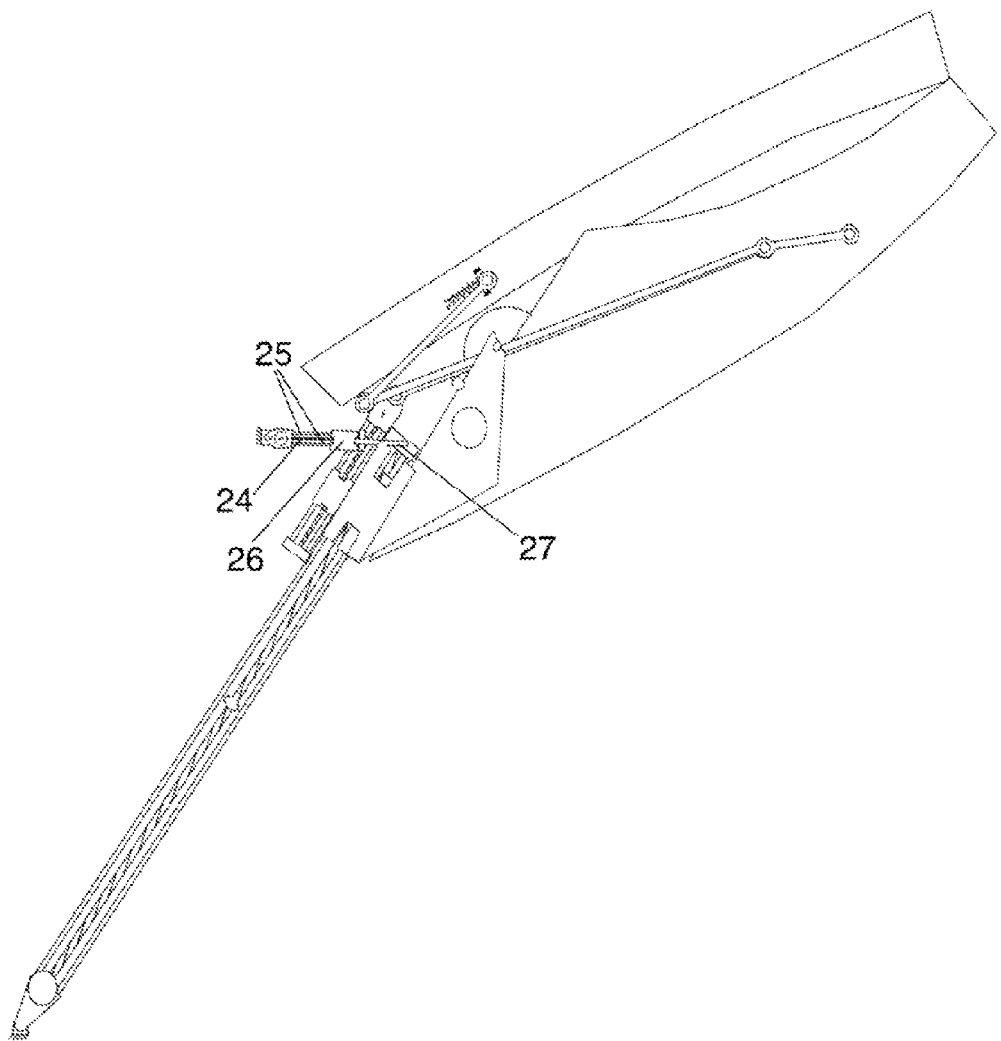
Figure 6:
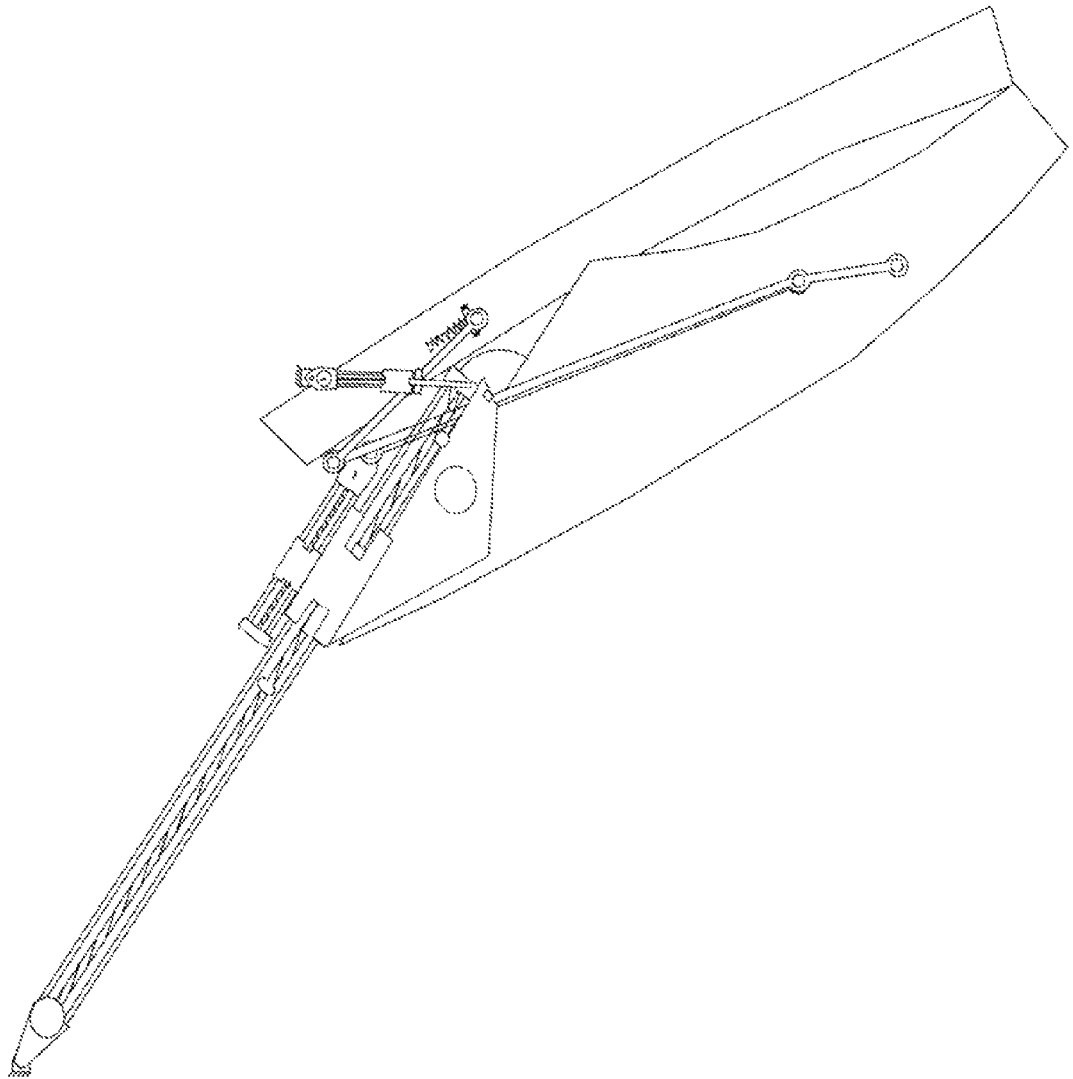
Figure 7:
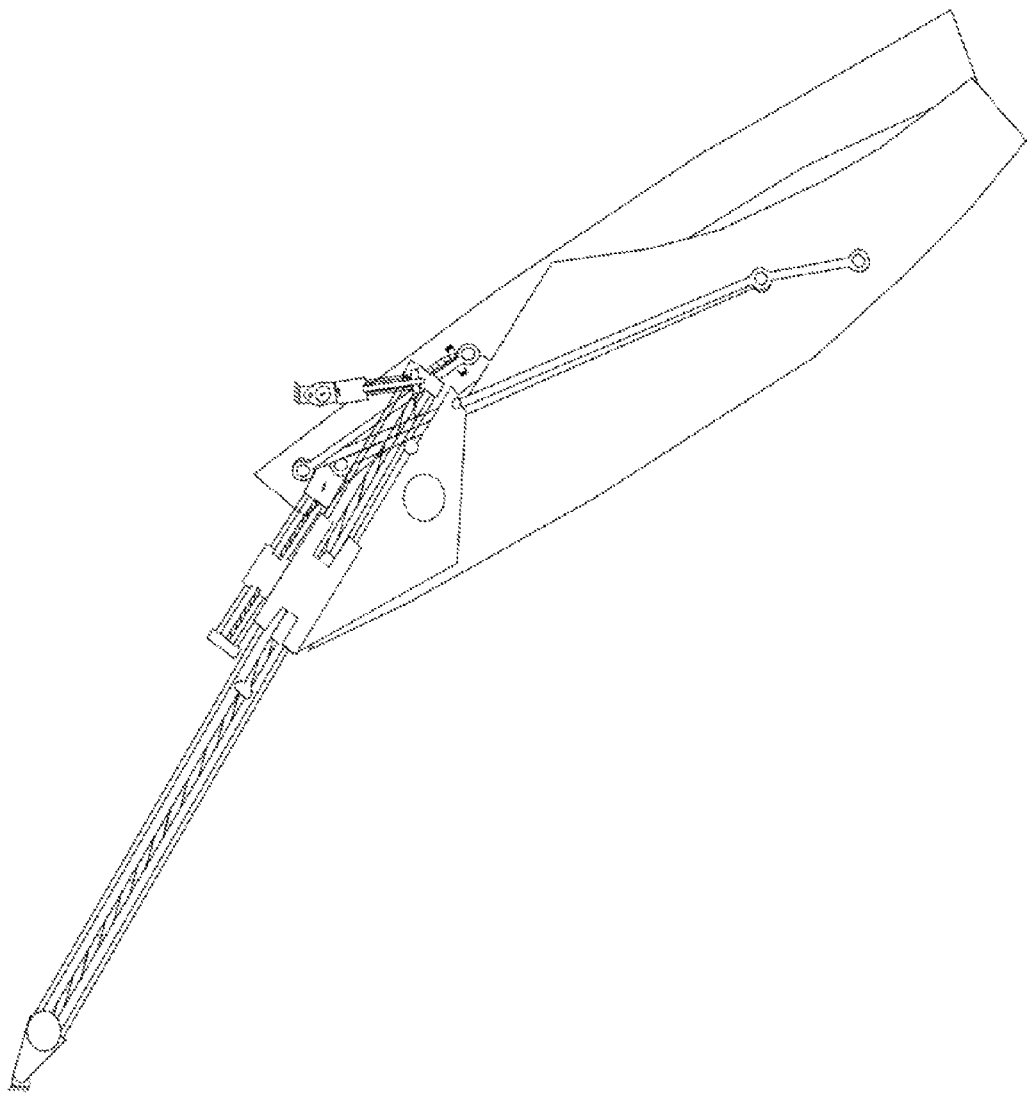
Figure 8:
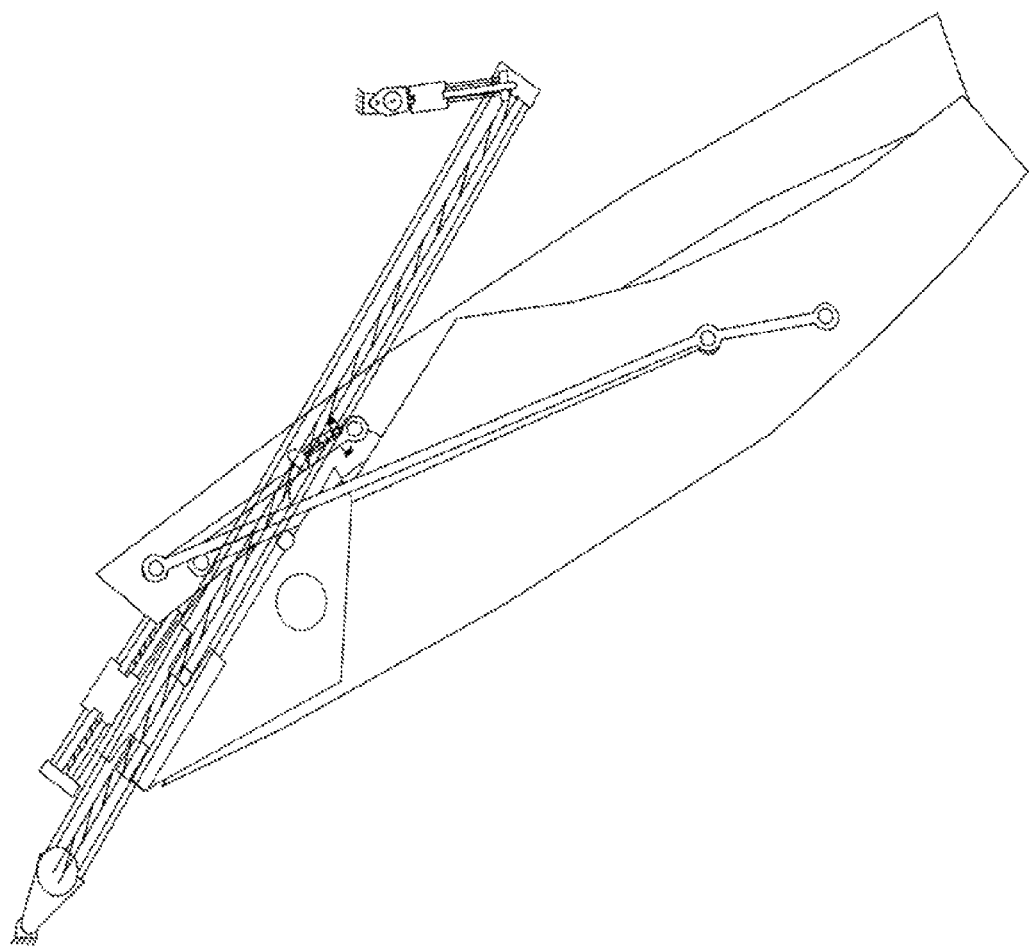
Figure 9:
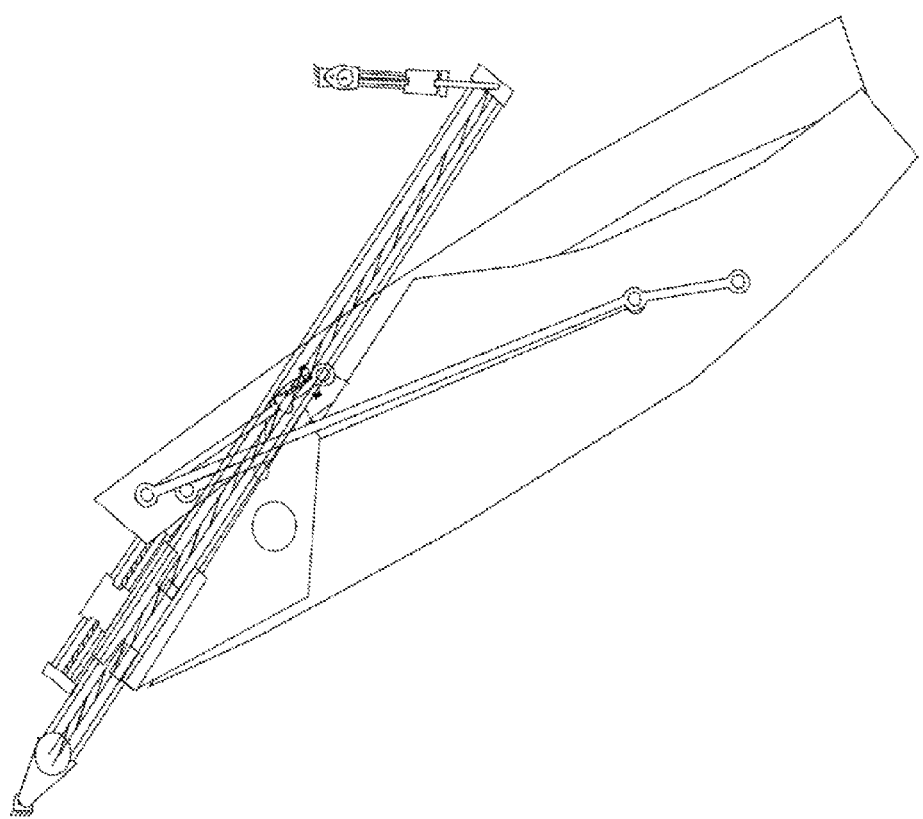

The current application is a national stage application of the PCT application number PCT/RU2013/000099 filed on Feb. 8, 2013 and claims priority to Russian application number RU2012131803/11 filed on Jul. 24, 2012, currently issued as a patent RU 2494882 and claims the benefit thereof, the entire contents of which is incorporated herein by reference.

BACKGROUND OF THE INVENTION

Field of the Invention

The invention relates to the automotive industry, specifically passenger cars with convertible roofs.

Description of Related Art Including Information Disclosed Under 37 CFR 1.97 and 1.98

A known car with cabriolet body (invention Pat. No. 2,369,491; MPK8 B60J7/02 (2006.01); Publication date: Oct. 10, 2009], comprising a roof with at least two segments, which are installed with the ability to move to an open position.

A known car with a convertible roof "Peugeot 207 CC" comprising front and rear sections of the roof, are hinged together, implemented such that they can rotate relative to one another and in folded position fit horizontally in the car trunk.

Another known car with convertible body (invention Pat. No. 2,271,942; MPK8B60J7/20 (2006.01) B62D25/00 (2006.01); Publication date: Mar. 20, 2006], comprising a body with seats and a convertible roof, which has a front section adjacent to the frame of the windshield, and a rear section, hinged to the rear part of the car body, and both sections are hinged to each other and are rotatable relative to each other and the car body from starting to ending positions and can fit in the rear of the body.

The disadvantage of this prior art is a significant reduction in usable trunk volume when moving the roof to an assembled state.

BRIEF SUMMARY OF THE INVENTION

The present invention reduces the difficulties and disadvantages of the prior art by providing a car roof conversion device which allows maximization of the trunk space while roof is in the assembled state. The system is comprised of the hinged together front and rear sections and is uniquely characterized by an introduction of a main moving support with a roof drive, a leverage drive, mounted to the main moving support, a system of hinged to each other and to front and rear section articulated levers, and a leverage drive stem, a system further comprises the electric motors with reduction gears to transmit rotation to screw shafts. The rear roof section is provided with a tooth element interacting with the roof drive. One of the levers is hinged to a shock absorber spring mounted on the front roof section.

BRIEF DESCRIPTION OF THE SEVERAL VIEWS OF THE DRAWING(S)

FIG. 1 shows the positions of device elements with a disassembled roof. Side view. FIGS. 2, 3, 4, 5, 6, 7, 8, and 9 show the positions of the device at different phases of its assembly, M in FIG. 3 designates the positions of the electric motors with reduction gears.

DETAILED DESCRIPTION OF THE INVENTION

The objective of the invention is to eliminate these disadvantages and provide high compactness of the device in assembled state.

The objective is achieved due to the car roof conversion device, having front and rear roof sections, hinged to each other and rotatable relative to each other and the car body from the starting position to the ending and positioned in the rear of the car body, being fitted with a main moving support and roof drive, leverage drive mounted on the main movable support, a system of articulated levers hinged together and to the front and rear roof sections and the drive stem of the lever system, as well as the drive of main moving support and drive of moving support inclination, appropriate pendulum supports of drives are secured at fixed points of the car body, while the roof rear section is provided with a toothed element, for example, a gear wheel fragment interacting with the roof drive.

Included in the system of articulated levers are consecutively hinged first and second levers, as well as a third lever, wherein the first end of the first lever is hinged to the shock absorber spring mounted on the front roof section, the second end of the second lever is hinged to the rear roof section, and the third lever is hinged to the second lever and the leverage drive stem.

The components of the drive for the main movable support include screw shafts and guides on which the main moving support can move.

The components of the lever system drive include screw shafts, providing movement of the lever system drive and stem along the guides mounted on the main moving support.

The main moving support inclination drive includes screw shafts, guides and sliders with rods connected to the main moving support drive.

The drives use electric motors with reduction gears to transmit rotation to screw shafts.

To achieve the desired accuracy and reliability when mating elements of the body and roof, during the process of transforming the lever system and the guide drive with screw shafts implemented in pairs and, as a whole, symmetrically along the central vertical plane of the car.

The technical result of the proposed invention is providing a more compact device in an assembled state due to the design of the articulated lever system and drives, and the specific activation sequence of the latter.

FIG. 1 shows the positions of device elements with a disassembled roof. Side view. FIGS. 2, 3, 4, 5, 6, 7, 8, and 9 show the positions of the device at different phases of its assembly.

The car roof conversion device includes the front 1 and rear 2 roof sections, hinged together, a main moving support 3 with roof drive 13, leverage drive 4 mounted at the main moving support 3, system of articulated levers 5, and hinged to front 1 and rear 2 roof sections and leverage 5 drive 4 stem 6, as well as drive 7 of main moving support 3 and inclination drive 8 of moving support 3, appropriate pendulum supports 9 and 10 are secured at fixed points 11 of the car body, while the roof rear section 2 is provided with tooth element 12, for example, gear wheel fragment interacting with the roof drive 13.

Included in the system of articulated levers 5 are consecutive hinged first and second levers 14 and 15, as well as a third lever, wherein the first end 17 of the first lever 15 is hinged to the shock absorber spring 18 mounted on the front roof section 1, the second end 19 of the second lever 15 is hinged to the rear roof section 2, and the third lever 16 is hinged to the second lever 15 and the leverage system 5 drive 4 stem 6.

The main moving support 3 drive 7 includes screw shafts 20 and guides 21 along which the main moving support 3 can move.

Leverage system 5 drive 4 includes screw shafts 22, allowing the drive 4 stem 6 to move along the guides 23, mounted to the main moving support 3.

The inclination drive 8 of the main moving support 3 drive 7 includes screw shafts 24, guides 25 and sliders 26 with rods 27, connected to the main moving support 3 drive 7.

The drives use electric motors with reduction gears to transmit rotation to screw shafts.

The car roof conversion device folding operates as follows.

Stage I. At the appropriate rotation of the screw shaft 20 the main moving support 3 with roof drive 13 performs an upwards move along the twin guides 21.

Stage II. Simultaneously with the upwards motion of the moving support 3 the rear section 2 of the roof rotates from a horizontal to a vertical position by the operation of the gear element 12 mounted to it and the roof drive 13.

Stage III. The system of articulating levers 5, connected to the drive 4 stem 6, moves along the guides 23 as the screw shafts 22 rotate, producing lift and support for the front section 1 of the roof. The shock absorber spring 18, mounted on the front section 1 of the roof, compensates for the lack of length of the first lever 14 in the first stage of the roof folding, ending when the drive 4 reaches the uppermost position.

Stage IV. Screw shafts 24 of the inclination drive 8 move the sliders 26 with the rods 27 along the guides 25, connected to the main moving support 3 drive 7, to the rearmost position, thereby allowing the subsequent lowering of the front section 1 of the roof.

Stage V. Drive 4 lowers the drive stem 6, connected to the lever system 5, thus lowering the front section 1 of the roof by rotating it relative to the rear section 2.

Stage VI. Inclination drive 8 moves the main moving support 3 drive 7 to the furthest forward position, resulting in the squeezing of the two roof sections.

Stage VII. Drive 7 moves the main moving support 3 with folded roof sections to the lowest position, squeezing the two roof sections into the cavity between the arches of the rear wheels behind the rear seat.

Stage VIII. Inclination drive 8 moves the main moving support 3 drive 7 to the rearmost position, reducing the height dimensions of the assembled device.

Unfolding of the roof happens in the reverse sequence.

The claimed invention provides greatly improved compactness in an assembled state, saving 40 to 60 percent of the usable volume of the trunk when convening the roof to an assembled state.

The invention claimed is:

1. A car roof conversion device, comprising: a front and a rear roof section, hinged together and rotatable from a starting position to an ending position and able to be placed in a rear part of a car body, uniquely characterized by an introduction of a main moving support with a roof drive, a leverage drive, mounted to the main moving support, a system of articulated levers, hinged to each other and to the front and the rear roof sections and a leverage drive stem, as well as a main moving support drive and a moving support inclination drive, an appropriate pendulum support of said latter drives are hinged at fixed points of the car body, while the rear roof section is provided with a tooth element interacting with the roof drive.

2. The car roof conversion device according to claim 1, uniquely characterized by the system of articulated levers with consecutively hinged first and second levers, as well as a third lever, wherein the first end of the first lever is hinged to a shock absorber spring mounted on the front roof section, a second end of the second lever is hinged to the rear roof section, and the third lever is hinged to the second lever and the leverage drive stem.

3. The car roof conversion device according to claim 1, uniquely characterized by components of the drive for the main movable support including screw shafts and guides on which the main moving support moves.

4. The car roof conversion device according to claim 1, uniquely characterized by components of the leverage drive including screw shafts, providing movement of the lever system drive and the stem along the guides mounted on the main moving support.

5. The car roof conversion device according to claim 1, uniquely characterized by the main moving support inclination drive including screw shafts, guides and sliders with rods connected to the main moving support drive.

6. The car roof conversion device according to claim 1, wherein the drives use of electric motors with reduction gears to transmit rotation to screw shafts.

7. The car roof conversion device according to claim 2, wherein the drives use of electric motors with reduction gears to transmit rotation to screw shafts.

8. The car roof conversion device according to claim 3, wherein the drives use of electric motors with reduction gears to transmit rotation to screw shafts.

9. The car roof conversion device according to claim 4, wherein the drives use of electric motors with reduction gears to transmit rotation to screw shafts.

10. The car roof conversion device according to claim 5, wherein the drives use of electric motors with reduction gears to transmit rotation to screw shafts.

11. The car roof conversion device according to claim 1, wherein the tooth element is a gear wheel fragment.

* * * * *